US012773958B2

(12) United States Patent
Delepouve

(10) Patent No.: US 12,773,958 B2
(45) Date of Patent: Oct. 27, 2026

(54) BIDIRECTIONAL ON-BOARD CHARGER OF A VEHICLE AND METHOD FOR DIAGNOSING A FUNCTION OF A RELAY WHICH THE ON-BOARD CHARGER COMPRISES

(71) Applicant: Schaeffler Technologies AG & Co. KG, Herzogenaurach (DE)

(72) Inventor: Sébastien Delepouve, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/233,863

(22) Filed: Jun. 10, 2025

(65) Prior Publication Data

US 2026/0034949 A1 Feb. 5, 2026

(30) Foreign Application Priority Data

Aug. 1, 2024 (FR) ...................................... 2408510

(51) Int. Cl.
*B60R 16/023* (2006.01)
*B60R 16/033* (2006.01)
(Continued)

(52) U.S. Cl.
CPC ........ *B60R 16/0232* (2013.01); *B60R 16/033* (2013.01); *G07C 5/0808* (2013.01);
(Continued)

(58) Field of Classification Search
CPC . B60R 16/0232; B60R 16/033; G07C 5/0808; H02J 7/855; H02J 2207/20;
(Continued)

(56) References Cited

U.S. PATENT DOCUMENTS 10,391,864 B2 * 8/2019 Patel ..................... B60L 3/0046
2003/0066695 A1 * 4/2003 Beckerman ............... B60T 1/10 180/65.29
(Continued)

FOREIGN PATENT DOCUMENTS

CN 111038266 A 4/2020
CN 215894753 U 2/2022
(Continued)

OTHER PUBLICATIONS

French Search Report for FR2408510, dated Feb. 14, 2025, 1 page.

*Primary Examiner* — Richard M Camby
(74) *Attorney, Agent, or Firm* — NIXON & VANDERHYE

(57) ABSTRACT

One aspect of the invention relates to a bidirectional on-board charger 2 for a vehicle 1, comprising:

- a bidirectional AC-to-DC converter 8 designed to supply power to an electrical power supply socket 6 for an external electrical device;
- means for detecting an electrical insulation fault 9, connected to a phase line 12 and to a neutral line 13 of said electrical power supply socket 6;
- a switch 16 arranged on said phase line 12;
- a switching means 18 designed to control the switch 16 between a first position P1 in which the means 9 are connected to the socket 6 and a second position P2;
- a resistor 20 which, when the switch 16 is in the second position P2, is electrically connected to the switch 16 and to a ground 10 of the vehicle.

9 Claims, 2 Drawing Sheets

(51) Int. Cl.

| | |
|---|---|
| ***G07C 5/08*** | (2006.01) |
| ***H02J 7/00*** | (2006.01) |
| *B60L 1/00* | (2006.01) |

(52) U.S. Cl.
CPC ............... *H02J 7/855* (2026.01); *B60L 1/006* (2013.01); *B60L 2210/30* (2013.01); *B60L 2210/44* (2013.01); *H02J 2207/20* (2020.01)

(58) Field of Classification Search
CPC .. B60L 1/006; B60L 2210/30; B60L 2210/44; B60L 3/0023; B60L 53/14; B60L 3/0069; B60L 53/22; B60L 2210/40; Y02T 10/70; Y02T 10/7072; Y02T 90/14; G01R 31/006; G01R 31/52
See application file for complete search history.

(56) References Cited

U.S. PATENT DOCUMENTS

| | | | | |
|---|---|---|---|---|
| 2014/0211345 | A1* | 7/2014 | Thompson | B60L 3/00 335/11 |
| 2018/0029484 | A1* | 2/2018 | Boesing | B60L 53/24 |
| 2018/0201142 | A1* | 7/2018 | Galin | B60L 53/14 |
| 2019/0202300 | A1* | 7/2019 | Pastor | B60L 53/14 |
| 2021/0405116 | A1 | 12/2021 | Lee et al. | |

FOREIGN PATENT DOCUMENTS

| | | | |
|---|---|---|---|
| CN | 117533132 | A | 2/2024 |
| EP | 3136115 | B1 | 11/2022 |
| KR | 20160121079 | A | 10/2016 |
| KR | 20210010699 | A | 1/2021 |

* cited by examiner

[Fig. 1]
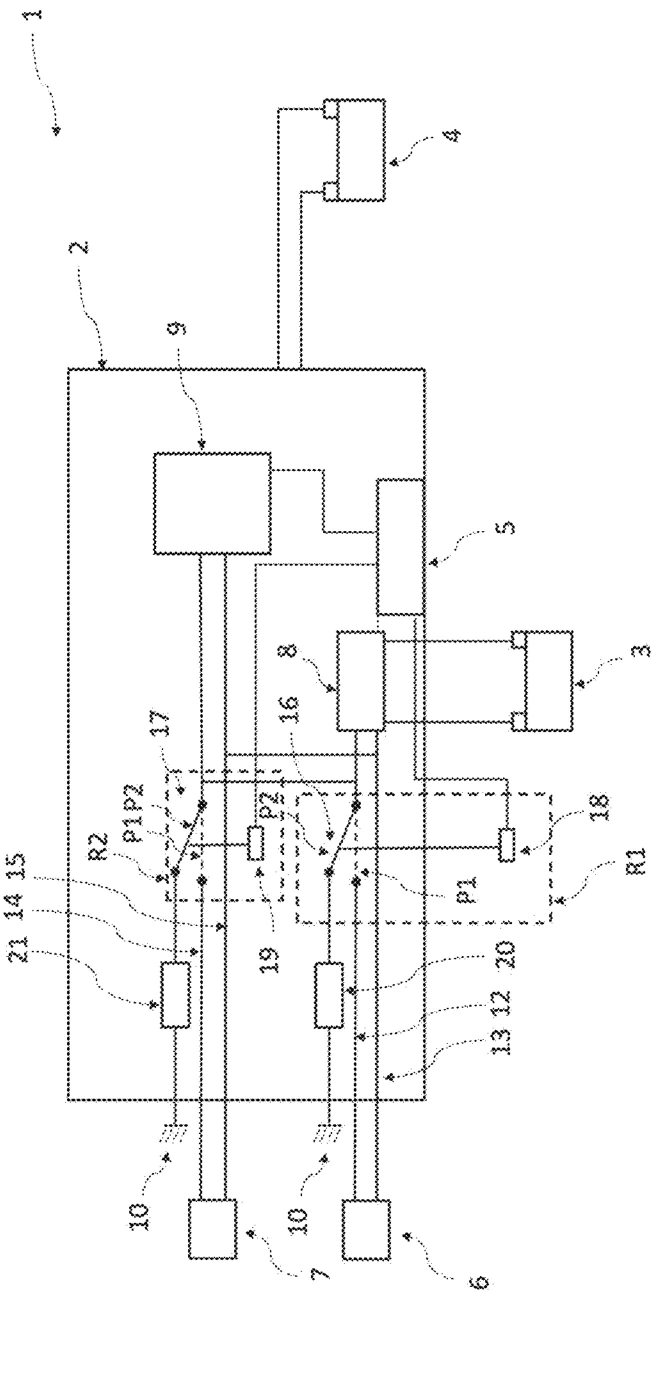

[Fig. 2]
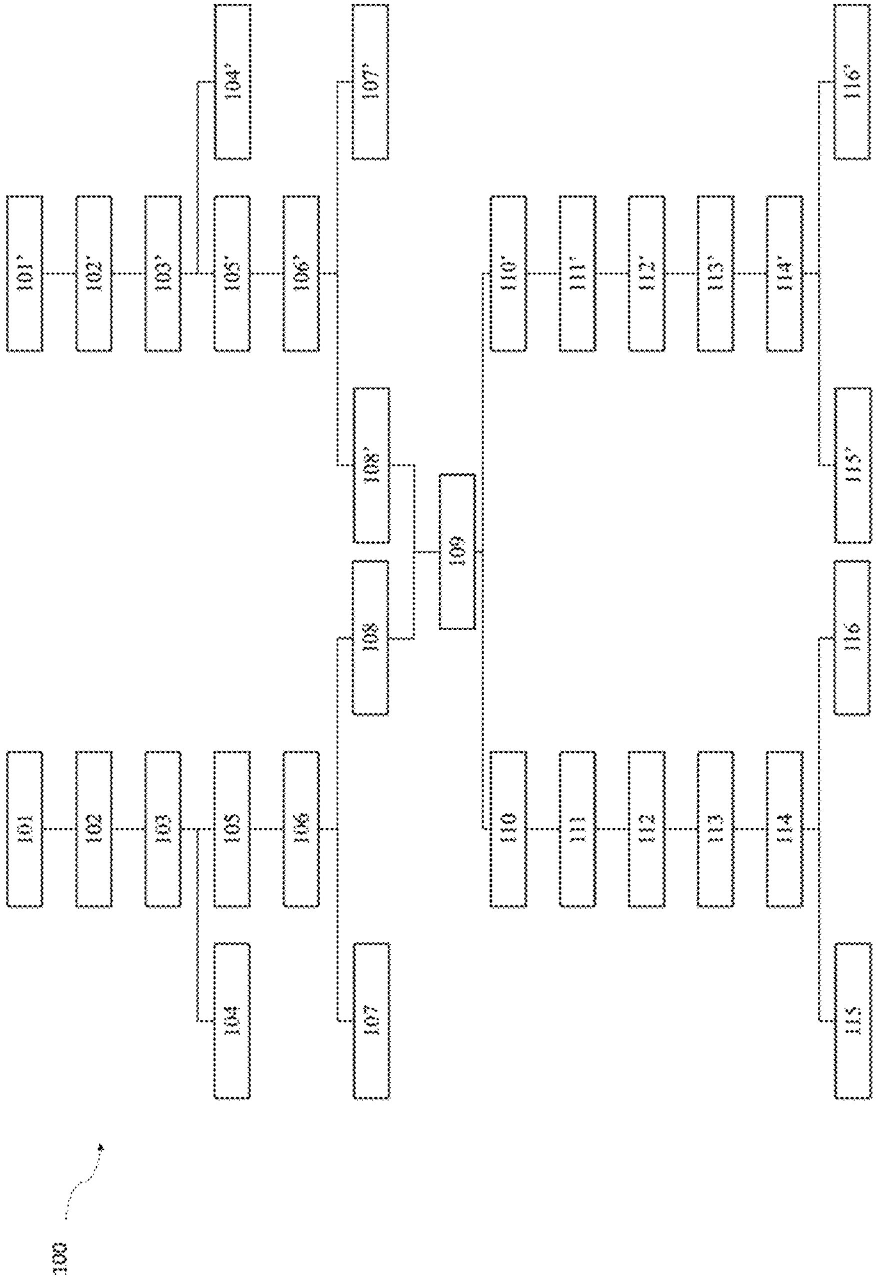

BIDIRECTIONAL ON-BOARD CHARGER OF A VEHICLE AND METHOD FOR DIAGNOSING A FUNCTION OF A RELAY WHICH THE ON-BOARD CHARGER COMPRISES

CROSS-REFERENCE TO RELATED APPLICATION

This application claims priority to French Application No. 2408510 filed Aug. 1, 2024, the entire contents of which are hereby incorporated by reference.

TECHNICAL FIELD OF THE INVENTION

The present invention relates to a bidirectional on-board charger for a motor vehicle designed to diagnose a function of at least one first relay which said on-board charger comprises, and a method for diagnosing a function of at least one first relay which the on-board charger comprises.

The invention applies to electric vehicles allowing, in particular, equipment outside the vehicle to be supplied with electricity from energy stored in a high-voltage battery of the vehicle. This type of use is commonly referred to as "Vehicle-to-Load" (V2L).

Technological Background to the Invention

Electric vehicles are known that are equipped with an on-board charger that is configured, on the one hand, to recharge a high-voltage battery, referred to as traction battery, of the vehicle and, on the other hand, to supply electric power to a low-voltage battery, referred to as service battery, from the energy stored in the high-voltage battery, an on-board network of the vehicle and an item of electrical equipment outside the vehicle, for example a computer having an electrical cable connected to an electrical power supply socket which the vehicle comprises. Such an on-board charger is commonly referred to by a person skilled in the art by the acronym OBC for "on-board charger".

This on-board charger usually comprises an AC/DC "Alternating Current/Direct Current" converter, designed to:

- convert a 220 V or 110 V AC voltage (according to the electrical standard of the region) supplied by the external electrical power supply source to a DC voltage compatible with the high-voltage battery when the high-voltage battery is recharged via an electrical power supply source outside the vehicle, wherein the external electrical power supply source can be formed by a domestic socket, a domestic fixed station (commonly referred to as a wallbox) or a charging point of a highway station;
- when an item of electrical equipment outside the vehicle is connected to the electrical power supply socket, converting the DC voltage stored in the high-voltage battery into AC voltage, for example of single-phase type, in order to supply power to the item of external electrical equipment connected to the electrical power supply socket.

In order to guarantee the safety of users of the vehicle, the on-board charger also comprises means for detecting an electrical insulation fault between the electrical ground of the vehicle (Class A electrical standard) and the phase lines of the vehicle (Class B electrical standard). These means are usually referred to by the acronym IMD for "insulating monitoring device".

These means for detecting an insulation fault are, in particular, electrically connected to a phase line and to a neutral line of the electrical power supply socket. In order to check the correct electrical insulation of the electrical power supply socket in relation to the electrical ground of the vehicle, formed, in particular, by the ground of the low-voltage battery, the means for detecting an electrical insulation fault inject a leakage current into the phase line and measure a voltage resulting from the impedance between the phase line of the vehicle and the electrical ground of the low-voltage battery. If the measured impedance is less than a threshold impedance value, the means for detecting an electrical insulation fault then deduce the presence of an electrical insulation fault therefrom. The supply of current originating from the AC-to-DC converter is then prohibited.

Furthermore, in order to guarantee the safety of a user, it is prohibited to connect this electrical power supply socket to an external electrical device or to a power source for charging the battery while the high-voltage battery is being recharged at a charging point.

To provide this functionality, the phase line of the electrical power supply socket comprises a switch that is actuatable by a switching means allowing the phase line to be connected to or disconnected from the AC-to-DC converter. This switch associated with the switching means together form a relay. Thus, when the vehicle is connected to a charging point outside the vehicle in order to charge the high-voltage battery, the electrical power supply socket intended to supply electrical power to an external electrical device is disconnected from the AC-to-DC converter by opening the switch. It is also known to connect a first voltage measurement device downstream of the switch and a second voltage measurement device upstream of the switch. Thus, if these two voltage measurement devices measure two different voltage values, this results in the switch being opened. Conversely, if these two voltage measurement devices measure two identical voltage values, this results in the switch being closed. This strategy makes it possible to check that there is no relay fault. However, this solution requires the presence of two voltage measurement devices and is obviously expensive.

The cost is further increased when the vehicle comprises two electrical power supply sockets for devices outside the vehicle. It is actually necessary to install two additional voltage measurement devices in order to ensure that the second relay operates correctly.

SUMMARY OF THE INVENTION

The invention offers a solution to the problem mentioned above by proposing an inexpensive alternative solution making it possible to detect a possible malfunction of the relay present on the phase line of the electrical power supply socket of electrical devices outside the vehicle.

In this context, the invention thus relates, in its broadest sense, to a bidirectional on-board charger for a motor vehicle, said on-board charger comprising:

- a bidirectional AC-to-DC converter, designed to convert:
  - a DC current from a high-voltage battery of the vehicle into an AC current suitable for supplying a first electrical power supply socket;
  - an AC current from a power supply source outside the vehicle connected to the first electrical power supply socket suitable into a DC current suitable for charging the high-voltage battery;
- means for detecting an electrical insulation fault between at least one phase line of the vehicle and an electrical ground of the vehicle, these means for detecting an electrical insulation fault being electrically connected to a first phase line and to a first neutral line of the first electrical power supply socket;

a first switch arranged on the first phase line;

a first switching means designed to control the first switch between a first, closed, position in which the means for detecting an electrical insulation fault are electrically connected to the first electrical power supply socket and a second position in which the first switch is open, said first switch and first switching means together forming a first relay;

a first resistor which, when the first switch is in the second position, is electrically connected to the first switch and to the electrical ground of the vehicle.

Thus, if the means for detecting an electrical insulation fault emit a leakage current on the first phase line, these means are able to determine an impedance value present between the phase line and the ground of the vehicle. This impedance value determined by the means for detecting an electrical insulation fault must differ depending on whether the switch is in the first position (in other words, the leakage current does not flow through the first resistor) or whether the switch is in the second position and the leakage current flows through the first resistor.

This on-board charger therefore makes it possible to detect a possible malfunction of the first relay without it being necessary to add a voltage measurement device downstream of the first switch and a voltage measurement device upstream of the first switch. In order to diagnose the function of the first relay, the on-board charger uses means for detecting an electrical insulation fault that are already present in the on-board charger. The cost of this on-board charger is therefore reduced compared with those of the prior art.

In addition to the features just mentioned in the preceding paragraph, the on-board charger according to this aspect of the invention can have one or more additional characteristics from among the following, considered individually or in all technically possible combinations.

According to one non-limiting embodiment of the invention, the AC-to-DC converter is furthermore designed to convert a DC current from the high-voltage battery of the vehicle into an AC current suitable for supplying a second electrical power supply socket of an electrical device outside the vehicle;

the means for detecting an electrical insulation fault are electrically connected to a second phase line and to a second neutral line of the second electrical power supply socket;

the on-board charger further comprises a second switch arranged on the second phase line;

a second switching means designed to control the second switch between a first, closed, position in which the means for detecting an electrical insulation fault are electrically connected to the second electrical power supply socket and a second position in which the second switch is open, the second switch and second switching means together forming a second relay;

a second resistor which, when the second switch is in the second position, is electrically connected to the second switch and to the electrical ground of the vehicle.

According to one non-limiting embodiment of the invention, the first resistor and the second resistor have impedance values that differ from one another.

Another aspect of the invention relates to an electric or hybrid vehicle comprising an on-board charger according to any one of the aforementioned embodiments of the invention.

A different aspect of the invention relates to a method for diagnosing a function of at least one first relay which an on-board charger for a vehicle according to any one of the aforementioned embodiments comprises, the method comprising the following steps, carried out when the AC-to-DC converter is inactive, of:

controlling the first switch via the first switching means to move it into its second position;

generating a leakage current on the first phase line via the means for detecting an electrical insulation fault;

determining a first impedance value on the first phase line via the means for detecting an electrical insulation fault, depending on the leakage current;

if the first impedance value is less than a predetermined first impedance threshold, controlling the first switch via the first switching means in order to move it into its first position;

determining a second impedance value on the first phase line via the means for detecting an electrical insulation fault, depending on the leakage current;

if a difference between the first impedance value and the second impedance value is less than a predetermined second impedance threshold, determining a malfunction of the first relay;

if the difference between the first impedance value and the second impedance value is greater than a predetermined third impedance threshold, determining a correct function of the first relay.

According to one non-limiting embodiment of the invention, the method comprises the steps of:

controlling the second switch via the second switching means to move it into its second position;

generating a leakage current on the second phase line via the means for detecting an electrical insulation circuit fault;

determining a first impedance value on the second phase line via the means for detecting an electrical insulation fault, depending on the leakage current;

if the first impedance value is less than the predetermined first impedance threshold, controlling the second switch via the second switching means to move it into its first position;

determining a second impedance value on the second phase line via the means for detecting an electrical insulation fault, depending on the leakage current;

if the difference between the first impedance value and the second impedance value is less than the predetermined second impedance threshold, determining a malfunction of the second relay;

if the difference between the first impedance value and the second impedance value is greater than the predetermined third impedance threshold, determining correct operation of the second relay.

According to one non-limiting embodiment of the invention, when the first impedance value of the first phase line is greater than the predetermined first impedance threshold, the method comprises a step of determining correct operation of the first relay;

when the first impedance value of the second phase line is greater than the predetermined first impedance threshold, the method comprises a step of determining correct operation of the second relay.

According to one non-limiting embodiment of the invention, the method comprises the steps of:

- activating the bidirectional AC-to-DC converter via control means of the on-board charger;
- controlling the first switch via the first switching means to move it into its second position;
- generating a leakage current on the first phase line via the means for detecting an electrical insulation fault;
- determining a first impedance value on the first phase line via the means for detecting an electrical insulation fault, depending on the leakage current;
- controlling the first switch via the first switching means into the first position;
- determining a second impedance value on the first phase line via the means for detecting an electrical insulation fault, depending on the leakage current;
- if the difference between the determined first impedance value and the determined second impedance value is less than the predetermined second impedance threshold, determining a malfunction of the first relay;
- if the difference between the determined first impedance value and the determined second impedance value is greater than the predetermined third impedance threshold, determining correct operation of the first relay.

According to one non-limiting embodiment of the invention, the method comprises the steps of:

- controlling the second switch via the second switching means to move it into its second position;
- generating a leakage current on the second phase line via the means for detecting an electrical insulation fault;
- determining a first impedance value on the second phase line via the means for detecting an electrical insulation fault, depending on the leakage current;
- controlling the second switch via the second switching means into the first position;
- determining a second impedance value on the second phase line via the means for detecting an electrical insulation fault, depending on the leakage current;
- if the difference between the determined first impedance value and the determined second impedance value is less than the predetermined second impedance threshold, determining a malfunction of the second relay;
- if a difference between the determined first impedance value and the determined second impedance value is greater than the predetermined second impedance threshold, determining correct operation of the second relay.

The invention and its various applications will be better understood by reading the following description and studying the accompanying figures.

BRIEF DESCRIPTION OF THE FIGURES

The figures are shown as indicative and in no way limiting of the invention.

FIG. 1 shows a non-limiting exemplary embodiment of an on-board charger according to the invention.

FIG. 2 shows the steps of a method for diagnosing a function of at least one first relay which an on-board charger for a vehicle according to the invention comprises.

DETAILED DESCRIPTION

FIG. 1 shows a non-limiting exemplary embodiment of an electric vehicle 1 equipped with an on-board charger 2 according to the invention.

The electric vehicle 1 comprises a high-voltage battery 3, a low-voltage battery 4 used, in particular, to supply power to control means 5 of the on-board charger 2, a first electrical power supply socket 6 and a second electrical power supply socket 7.

The first electrical power supply socket 6 is bidirectional and makes it possible, according to the circumstances, to either charge the high-voltage battery 3 or to supply electrical power to an electrical device outside the vehicle 1.

The second electrical power supply socket 7, for its part, makes it possible to supply electrical power to an electrical device outside the vehicle 1.

The electrical device outside the vehicle is, for example, an electrical device operating at an AC power supply voltage in accordance with known electrical standards (110 V, 230 V or 240 V). The external electrical device comprises an electrical plug connected by a cable to the equipment and is connected to the first or second electrical power supply electrical power socket 6, 7 of the vehicle 1 dedicated to this effect. Such an external electrical device may be formed, for example, by a computer, a tablet computer or a kettle.

The first and second electrical power supply sockets 6, 7 can be electrically isolated from the high-voltage battery 3 through galvanic isolation. Furthermore, the first and second electrical power supply sockets 6, 7 can be electrically isolated from the low-voltage battery 4 and the control means 5 through galvanic isolation.

The on-board charger 2 comprises a bidirectional AC-to-DC converter 8 that is arranged to convert a DC current from the high-voltage battery 3 into an AC current suitable for supplying power to the first electrical power supply socket 6 and the second electrical power supply socket 7.

The bidirectional AC-to-DC converter 8 is also arranged to convert an AC current coming from a high-voltage power supply source outside the vehicle connected to the first electrical power supply socket 6 into a DC current suitable for charging the high-voltage battery 3.

The AC-to-DC converter 8 is provided, for example, with power factor correction, and is referred to as a PFC AC-to-DC converter. The on-board charger 2 further comprises means for detecting an electrical insulation fault 9 between at least one phase line of the vehicle 1 and an electrical ground 10 of the vehicle 1. These means 9 are usually referred to by the acronym IMD for "insulating monitoring device".

These means for detecting an electrical insulation fault 9 are electrically connected to a first phase line 12 and to a first neutral line 13 that are connected to the first electrical power supply socket 6 and to a second phase line 14 and to a second phase line neutral line 15 that are connected to the second electrical power supply low-power socket 7.

The on-board charger 2 further comprises a first switch 16 arranged on the first phase line 12 and a second switch 17 arranged on the second line phase 14.

The on-board charger 2 also comprises a first switching means 18 that is designed to control the first switch 16 between a first, closed, position P1 in which the means for detecting an electrical insulation fault 9 are electrically connected to the first electrical power supply socket 6 and a second, open, position P2.

The first switch 16 and the first switching means 18 together form a first relay R1.

The on-board charger 2 also comprises a second switching means 19 that is designed to control the second switch 17 between a first, closed, position P1 in which the means for detecting an electrical insulation fault 9 are electrically connected to the second electrical power supply socket 7 and a second, open, position P2.

The second switch 17 and the second switching means 19 together form a second relay R2.

According to the embodiment shown, the on-board charger 2 further comprises:

- a first resistor 20 which, when the first switch 16 is in the second, open, position P2, is electrically connected to the first switch 16 and to the electrical ground 10 of the vehicle 1;
- a second resistor 21 which, when the second switch 17 is in the second, open, position P2, is electrically connected to the second switch 17 and to the electrical ground 10 of the vehicle 1.

The on-board charger 2 also comprises means 5 for controlling the on-board charger 2. These control means 5 control, in particular, the first and second switching means 18, 19 and the AC-to-DC converter 8.

FIG. 2 shows a non-limiting embodiment of a method 100 according to the invention, carried out by the on-board charger 2 according to the invention, as shown in FIG. 1.

According to one non-limiting embodiment, the steps of the method 100 below are carried out when the AC-to-DC converter 8 is inactive, in other words when the AC-to-DC converter 8 does not supply any electrical power to any one of the first and second electrical power supply sockets 6, 7 and does not receive any electrical power from an external electrical power source connected to the first electrical power socket 6.

The method 100 comprises the steps of:

- controlling 101 the first switch 16 via the first switching means 18 to move it into its second, open, position P2, and
- controlling 101' the second switch 17 via the second switching means 19 to move it into its second, open, position P2.

The first switch 16 is thus electrically connected to the first resistor 20 and the second switch 17 is electrically connected to the second resistor 21.

The method 100 then comprises the steps of:

- generating 102 a leakage current on the first phase line 12 via the means for detecting an electrical insulation fault 9; and
- generating 102' a leakage current on the second phase line 14 via the means for detecting an electrical insulation fault 9.

According to one non-limiting exemplary embodiment, the leakage current may, for example, be between 10 μA and 50 μA.

Then,

- depending on the leakage current flowing on the first phase line 12, the method 100 carries out a determination step 103, via the means for detecting an electrical insulation fault 9, to determine a first impedance value on the first phase line 12; and
- depending on the leakage current flowing on the second phase line 14, the method 100 carries out a determination step 103', via the means for detecting an electrical insulation fault 9, to determine a first impedance value on the second phase line 14.

If the first impedance value of the first phase line 12 is greater than a first predetermined impedance threshold, the method 100 comprises a determination step 104 to determine the correct operation of the first relay R1. Similarly, if the first impedance value of the second phase line 14 is greater than the first predetermined impedance threshold, the method 100 comprises a determination step 104' to determine the correct operation of the second relay R2.

By way of a non-limiting example, the first predetermined impedance threshold is between 1 mega-ohms and 10 mega-ohms.

However, if the first impedance value is less than the first predetermined impedance threshold, the method 100 carries out the steps of:

- controlling 105 the first switch 16 into the first, closed, position P1 via the first switching means 18, then determining 106 a second impedance value on the first phase line 12 via the means for detecting an electrical insulation fault 9, depending on the leakage current; and
- controlling 105' the second switch 17 into the first, closed, position P1 via the second switching means 19, then determining 106' a second impedance value on the second phase line 14 via the means for detecting an electrical insulation fault 9, depending on the leakage current.

The method 100 then comprises the steps, carried out by the means for detecting an electrical insulation fault 9 or by the control means 5, of:

- on the first phase line 12, if a difference between the first determined impedance value and the second determined impedance value is:
  - less than a second predetermined impedance threshold, determining 107 a malfunction of the first relay R1;
  - greater than a third predetermined impedance threshold, determining 108 the correct operation of the first relay R1;
- on the second phase line 14, if a difference between the first determined impedance value and the second determined impedance value is:
  - less than the second predetermined impedance threshold, determining 107' a malfunction of the second relay R2;
  - greater than the third predetermined impedance threshold, determining 108' the correct operation of the second relay R2.

According to one non-limiting embodiment, the second predetermined impedance threshold and the third predetermined impedance threshold are equal.

When a malfunction of one of the relays R1, R2 is detected, the control means 5 can deactivate the AC-to-DC converter 8 to avoid a potential risk of electrocution for users of the vehicle 1.

According to one non-limiting embodiment, the method 100 comprises a step of activating 109 the AC-to-DC converter 8 via the control means 5, for example when an external electrical device is connected to the first power supply socket 6.

Then, for example when the external electrical device is disconnected, the method 100 comprises the steps of:

- controlling 110 the first switch 16 via the first switching means 18 to move it into its second position P2;
- controlling 110' the second switch 17 via the second switching means 19 to move it into its second position P2.

The method 100 then comprises the steps of:

- generating 111 a leakage current on the first phase line 12 via the means for detecting an electrical insulation fault 9; and
- generating 111' a leakage current on the second phase line 14 via the means for detecting an electrical insulation fault 9.

Then, depending on the leakage current flowing on the first phase line 12, the method 100 carries out a determination step 112, via the means for detecting an electrical insulation fault 9, to determine a first impedance value on the first phase line 12; and depending on the leakage current flowing on the second phase line 14, the method 100 carries out a determination step 112', via the means for detecting an electrical insulation fault 9, to determine a first impedance value on the second phase line 14.

The method 100 also carries out the steps of:

controlling 113 the first switch 16 into the first, closed, position P1 via the first switching means 18, then determining 114 a second impedance value on the first phase line 12 via the means for detecting an electrical insulation fault 9, depending on the leakage current; and controlling 113' the second switch 17 into the first, closed, position P1 via the second switching means 19, then determining 114' a second impedance value on the second phase line 14 via the means for detecting an electrical insulation fault 9, depending on the leakage current.

The method 100 then comprises the steps of:

on the first phase line 12, if a difference between the first determined impedance value and the second determined impedance value is:

less than the second predetermined impedance threshold, determining 115 a malfunction of the first relay R1;

greater than the third predetermined impedance threshold, determining 116 the correct operation of the first relay R1;

on the second phase line 14, if a difference between the first determined impedance value and the second determined impedance value is:

less than the second predetermined impedance threshold, determining 115' a malfunction of the second relay R2;

greater than the third predetermined impedance threshold, determining 116' the correct operation of the second relay R2.

Thus, by means of the method 100 according to the invention, it is possible to diagnose, at lower cost, the operation of the relays R1, R2, allowing the electrical power supply sockets 6, 7 that the vehicle 1 comprises to be connected to and disconnected from the AC-to-DC converter 8.

The invention claimed is:

1. A bidirectional on-board charger (2) for a motor vehicle (1), said on-board charger (2) comprising:

a bidirectional AC-to-DC converter (8) designed to convert:

a direct current from a high-voltage battery (3) of said vehicle (1) into an alternating current suitable for supplying a first electrical power supply socket (6);

an AC current from a power supply source outside said vehicle (1) connected to said first electrical power supply socket (6) into a DC current suitable for charging said high-voltage battery (3);

means for detecting an electrical insulation fault (9) between at least one phase line of the vehicle (1) and an electrical ground (10) of said vehicle (1), these means for detecting an electrical insulation fault (9) being electrically connected to a first phase line (12) and to a first neutral line (13) of said first electrical power supply socket (6);

a first switch (16) arranged on said first phase line (12);

a first switching means (18) designed to control said first switch (16) between a first, closed, position (P1) in which the means for detecting an electrical insulation fault (9) are electrically connected to said first electrical power supply socket (6) and a second position (P2) in which the first switch (16) is open, said first switch (16) and first switching means (18) together forming a first relay (R1);

said on-board charger (2) being characterized in that it further comprises a first resistor (20) which, when said first switch (16) is in the second position (P2), is electrically connected to the first switch (16) and to the electrical ground (10) of the vehicle (1).

2. The on-board charger (2) as claimed in claim 1, characterized in that:

the AC-to-DC converter (8) is further designed to convert a DC current from the high-voltage battery (3) of the vehicle (1) into an AC current suitable for supplying a second electrical power supply socket (7) of an electrical device outside said vehicle (1);

the means for detecting an electrical insulation fault (9) are electrically connected to a second phase line (14) and to a second neutral line (15) of said second electrical power supply socket (7);

the on-board charger (2) further comprises a second switch (17) arranged on said second phase line (14);

a second switching means (19) designed to control said second switch (17) between a first, closed, position (P1) in which the means for detecting an electrical insulation fault (9) are electrically connected to said second electrical power supply socket (7), and a second position (P2) in which said second switch (17) is open, said second switch (17) and second switching means (19) together forming a second relay (R2);

a second resistor (21) which, when said second switch (17) is in the second position (P2), is electrically connected to said second switch (17) and to the electrical ground (10) of the vehicle (1).

3. The on-board charger (2) as claimed in claim 2, characterized in that the first resistor (20) and the second resistor (21) have impedance values that differ from one another.

4. An electric or hybrid vehicle (1), characterized in that it comprises an on-board charger (2) as claimed in claim 1.

5. A method (100) for diagnosing a function of at least one first relay (R1) which an on-board charger (2) for a vehicle (1) comprises, as claimed in claim 2, said method (100) comprising the following steps, carried out when the AC-to-DC converter (8) is inactive, of:

controlling (101) the first switch (16) via the first switching means (18) to move it into its second position (P2);

generating (102) a leakage current on the first phase line (12) via the means for detecting an electrical insulation fault (9);

determining (103) a first impedance value on said first phase line (12) via said means for detecting an electrical insulation fault (9), depending on said leakage current;

if said first impedance value is less than a predetermined first impedance threshold, controlling (105) said first switch (16) via said first switching means (18) to move it into its first position (P1);

determining (106) a second impedance value on said first phase line (12) via said means for detecting an electrical insulation fault (9), depending on said leakage current;

if a difference between said first impedance value and said second impedance value is less than a predetermined second impedance threshold, determining (107) a malfunction of said first relay (R1);

if the difference between said first impedance value and said second impedance value is greater than a predetermined third impedance threshold, determining (108) correct operation of said first relay (R1).

6. A method (100) for diagnosing a function of at least one first relay (R1) as claimed in claim 5 which an on-board charger (2) for a vehicle (1), characterized in that it comprises the steps of:

controlling (101') the second switch (17) via the second switching means (19) to move it into its second position (P2);

generating (102') a leakage current on the second phase line (14) via the means for detecting an electrical insulation fault (9);

determining (103') a first impedance value on said second phase line (14) via said means for detecting an electrical insulation fault (9), depending on said leakage current;

if said first impedance value is less than the first predetermined impedance threshold, controlling (105') said second switch (17) via said second switching means (19) to move it into its first position (P1);

determining (106') a second impedance value on said second phase line (14) via said means for detecting an electrical insulation fault (9),depending on said leakage current;

if the difference between said first impedance value and said second impedance value is less than the predetermined second impedance threshold, determining (107') a malfunction of the second relay (R2);

if the difference between said first impedance value and said second impedance value is greater than the third predetermined impedance threshold, determining (108') correct operation of said second relay (R2).

7. The method (100) as claimed in claim 5, characterized in that, when the first impedance value of the first phase line (12) is greater than the first predetermined impedance threshold, the method (100) comprises a step of determining (104) correct operation of the first relay (R1);

when the first impedance value of the second phase line (14) is greater than said first predetermined impedance threshold, the method (100) comprises a step of determining (104') correct operation of the second relay (R2).

8. The method (100) as claimed in claim 5, characterized in that it comprises the following steps:

activating (109) the bidirectional AC-to-DC converter (8) via control means (5) for controlling the on-board charger (2);

controlling (110) the first switch (16) via the first switching means (18) to move it into its second position (P2);

generating (111) a leakage current on the first phase line (12) via the means for detecting an electrical insulation fault (9);

determining (112) a first impedance value on the first phase line (12) via the means for detecting an electrical insulation fault (9), depending on said leakage current;

controlling (113) said first switch (16) into the first position (P1) via said first switching means (18);

determining (114) a second impedance value on said first phase line (12) via the means for detecting an electrical insulation fault (9), depending on said leakage current;

if the difference between said determined first impedance value and said determined second impedance value is less than the predetermined second impedance threshold, determining (115) a malfunction of the first relay (R1);

if the difference between said determined first impedance value and said determined second impedance value is greater than the predetermined third impedance threshold, determining (116) correct operation of said first relay (R1).

9. The method (100) as claimed in claim 6, characterized in that it comprises the following steps:

controlling (110') the second switch (17) via the second switching means (19) to move it into its second position (P2);

generating (111') a leakage current on the second phase line (14) via the means for detecting an electrical insulation fault (9);

determining (112') a first impedance value on said second phase line (14) via the means for detecting an electrical insulation fault (9), depending on said leakage current;

controlling (113') said second switch (17) into the first position (P1) via said second switching means (19);

determining (114') a second impedance value on said second phase line (14) via the means for detecting an electrical insulation fault (9), depending on said leakage current;

if the difference between said determined first impedance value and said determined second impedance value is less than the predetermined second impedance threshold, determining (115') a malfunction of the second relay (R2);

if a difference between said determined first impedance value and said determined second impedance value is greater than the predetermined second impedance threshold, determining (116') correct operation of said second relay (R2).

* * * * *